Oct. 1, 1957  W. J. HIRTREITER ET AL  2,808,545
PRESSURE PICK-UP-DIFFERENTIAL-TYPE ACCELERATION-FREE
Filed Jan. 24, 1955
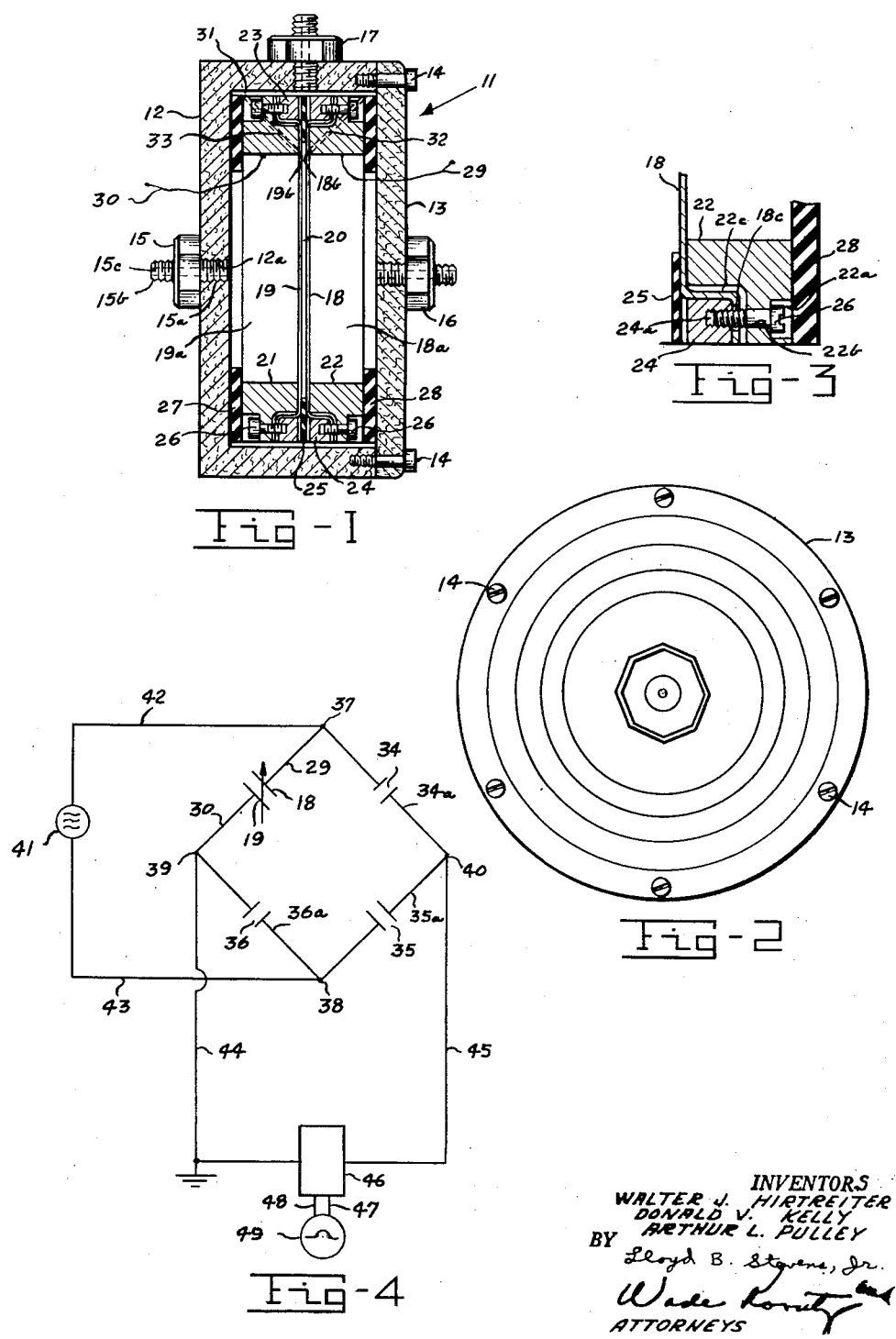
INVENTORS
WALTER J. HIRTREITER
DONALD V. KELLY
ARTHUR L. PULLEY
BY Lloyd B. Stevens, Jr.
Wade Koretz
ATTORNEYS

2,808,545

PRESSURE PICK-UP-DIFFERENTIAL-TYPE ACCELERATION-FREE

Walter J. Hirtreiter, Buffalo, N. Y., Donald V. Kelly, Milwaukee, Wis., and Arthur L. Pulley, Buffalo, N. Y., assignors to the United States of America as represented by the Secretary of the Air Force Application January 24, 1955, Serial No. 483,851

2 Claims. (Cl. 317—246)

This invention relates to a capacitive pressure pickup of the differential type and more particularly the invention relates to a capacitive pickup which is substantially nonresponsive to acceleration forces and is designed to indicate accurately small differential pressures under conditions of high acceleration.

Capacitive pickups are not broadly new in the art. They have been used under a wide variety of conditions to measure extremely high as well as low differential pressures. A few of these capacitive pickups have been designed with complex compensating means in an attempt to cancel out the effect of acceleration forces on the pressure measurements. None of them use a simple, inexpensive, dependable apparatus such as is disclosed herein.

It is a primary object of this invention to provide a pressure pickup of the differential, capacitive type which is substantially nonresponsive to acceleration forces and wherein a plurality of mechanically substantially identical, stretched-diaphragm condenser plates are positioned within a suitable container to form a condenser, the capacity of this condenser being variable according to the pressure applied to the pickup, and a bridge circuit is used to indicate the differential pressure.

Another object of this invention is to provide a capacitive pickup which is substantially nonresponsive to acceleration forces and is designed to indicate small differential pressures.

Still another object of this invention is to provide a pressure pickup which will measure differential pressures of a few inches of water when the pickup is subjected to accelerations of the order of 400 times gravity acceleration.

A further object of this invention is to provide a low cost rugged, pressure pickup of simple design particularly suitable for use in high speed aircraft and missiles.

An additional object of this invention is to provide a capacitive pressure pickup which is substantially nonresponsive to acceleration forces and is usable in helicopters and low speed aircraft.

The above objects and other objects which will be apparent from the following description of the invention and a preferred embodiment thereof are accomplished by this invention. The pressure pickup of the invention comprises a plurality of mechanically substantially identical, stretched-diaphragm condenser plates positioned within a suitable container. Mechanically substantially identical is defined to mean diaphragms whose response to acceleration forces is identical so no substantial change in the spacing between diaphragms is caused by accelerations as high even as 400 times gravity acceleration. These diaphragms are preferably positioned parallel to one another and are electrically insulated from one another. The diaphragms are so positioned within the container that separate pressure-tight compartments are formed between the diaphragms and the case. These diaphragms are made of electrically conductive material suitable for condenser plates and the diaphragms have separate electrical connections to each of them. The diaphragms are electrically insulated from one another.

Brass diaphragms are particularly suitable for this invention. Other materials such as steels, etc., however, are also usable as diaphragms. It is desirable that adjustable means such as brass stretching rings be used with the brass diaphragms to allow the tautness of the diaphragms to be adjusted. Mica insulation washers or other suitable insulating washers are used for separating the diaphragms and rubber gaskets are satisfactory for positioning the diaphragms within the case and sealing off the separate pressure-tight compartments. Pressure taps communicate with the pressure-tight compartments.

A plastic case, e. g., a phenolic fiber case, is a preferred type of case to be used for the pickup. A metal case, however, could be used provided the diaphragms and the electrical connections thereto are suitably insulated.

A capacitive bridge circuit driven by a high frequency oscillator and an amplifier-detector feeding a cathode ray tube attached to the bridge output are satisfactory means to indicate the differential pressures. The pressure pickup is connected as a variable condenser in one arm of the bridge circuit. Variations in pressure applied either between the plates or on the outsides thereof causes the plates to move closer together or farther apart depending on the pressure and method of application with a resultant variation of condenser capacitance of the pickup.

In order that the invention may be more clearly understood it will now be described more fully with reference to the accompanying drawings showing a specific embodiment thereof wherein:

Fig. 1 is an elevational view partially in section and partially diagrammatic of the pickup device;

Fig. 2 is a side elevational view of the cover of the pickup device;

Fig. 3 is a fragmentary view partially in section of a portion of the stretching rings showing in detail how the tautness of a diaphragm may be adjusted;

Fig. 4 is a schematic circuit diagram showing the pressure pickup connected as a variable condenser in one arm of a capacitive bridge which is driven by a high frequency oscillator using an amplifier-detector and cathode ray tube connected to the bridge output to interpret the results.

Details of the pressure pickup device are set forth in Figs. 1, 2 and 3. Pickup 11 consists of a cylindrical container 12 closed at one end and a cover 13 closing the other end thereof. The cover is attached to the container suitably by screws 14. A gasket (not shown) may be used between the container and cover to insure a pressure-tight fit. Pressure tap 15 is attached to the container by screwing a threaded portion 15a into a threaded hole 12a in the container. Tap 15 has an exterior threaded portion 15b for attaching pressure tubing to communicate with remote spaces where it is desired to measure pressure. Tap 15 has a hollow bore 15c communicating with compartment 19a.

A pressure tap 16 similar to tap 15 is attached to the cover 13, and tap 16 communicates with compartment 18a. For use, the pickup taps 15 and 16 will be externally connected by a Y-shaped connection (not shown), so the same pressure will be applied to compartments 18a and 19a, i. e., to the outside of diaphragm plates 18 and 19. The opposing pressure will be applied between the plates to compartment 20.

A similar pressure tap 17 is attached to case 12 and communicates with a peripheral space 31 in the case. Communication between space 31 and compartment 20 which is between plates 18 and 19 is provided by channels 32 and 33 in rings 22 and 21, respectively, and aligned openings 18b and 19b in the plates. One channel might be sufficient but it is preferred to use one or more channels per plate for fast communication of the pressure to the space 20 between the diaphragms.

The two mechanically substantially identical brass diaphragm condenser plates 18 and 19 of 0.001″ width each are separated by a 0.001″ width mica washer 25 providing a compartment 20 air space of 0.001″ width. It is preferred that the brass diaphragms be substantially identical in size, shape, weight, chemical composition, heat treatment, and fabrication. It is possible, however, that mechanically substantially identical diaphragms can be produced from metal alloys of unlike chemical composition.

When the brass diaphragms are mounted in the pickup they are adjusted to substantially equal tautness by stretching rings 21 and 22 and adjustable stretching rings 23 and 24 which are attached to the diaphragms and stretching rings 21 and 22 by screws 26. The proper adjustment of the diaphragms may be checked by testing the pickup measuring known pressure under acceleration conditions. It is possible that if the diaphragms are fixed at one point to the stretching rings that only one adjusting screw need be used per diaphragm but it is preferred to use two or more adjustable screws per diaphragm.

Insulating washers 27 and 28 which are suitably made of synthetic rubber are used to position the diaphragms and stretching rings within the case and to seal the compartment between the diaphragms and the compartments between a diaphragm and the case from one another.

Electrical connections 29 and 30 are attached to stretching rings 22 and 21, respectively, by brazing or other suitable means. Electrical contact is obtained with the diaphragms through physical contact of the stretching ring with the diaphragm. These electrical connections 29 and 30 are the means of attachment of the diaphragms in the bridge circuit described in Fig. 4.

Fig. 3 is a fragmentary, enlarged, detailed, sectional view of a portion of diaphragm 18 associated with insulating washer 25 and stretching rings 22 and 24. Also, a portion of insulating washer 28 is shown. Screw 26 which is positioned in a recess 22a in stretching ring 22, passes through an opening 22b in the ring, through an opening 18c in the diaphragm, and is screwed into a threaded recess 24a in adjustable stretching ring 24. By turning this screw it is possible to draw stretching ring 24 toward or away from ring 22 thereby the tautness in diaphragm 18 is either increased or reduced. Stretching ring 22 has an L-shaped cross section and adjustable stretching ring 24 a rectangular cross section. Ring 24 is positioned within the rectangular notch 22c in the outer periphery of ring 22, said notch resulting from the L-shape of the cross section of ring 22.

Fig. 4 shows a bridge type arranged with associated auxiliary components by which the pressure indications are interpreted. Diaphragm plates 18 and 19 appear in one arm of this bridge as variable condenser plates. Plate 18 is attached by conductor 29 to bridge terminal 37, and plate 19 is attached by conductor 30 to terminal 39. Condenser 34 in bridge arm 34a, condenser 35 in arm 35a and condenser 36 in arm 36a form the other three arms of the capacitive bridge. This bridge circuit is driven by high frequency oscillator 41 which is connected to the bridge by conductors 42 and 43 at bridge terminals 37 and 38. Output from the bridge is taken across terminals 39 and 40, terminal 39 being grounded. The output terminals are connected by conductors 44 and 45 to an amplifier-detector 46 which amplifies the output and detects it for application to cathode ray tube 49. The amplifier-detector is connected to the cathode ray tube by conductors 47 and 48.

When the bridge is in balance there will be no voltage drop across the output bridge terminals 39 and 40 since condensers 35 and 36 have equal capacities, and the condenser formed by diaphragms 18 and 19 will have a capacity equal to that of condenser 34. A slight variation of the differential pressure applied to pickup 11 of Fig. 1 will cause the capacity of the condenser formed by diaphragms 18 and 19 to vary. Thereby the high frequency output of oscillator 41 will appear modulated across terminals 39 and 40. This modulated output is amplified and detected by amplifier-detector 46 for application to cathode ray tube 49 from which an indication of the differential pressure is obtained by conventional calibration methods.

Although the invention has been described in terms of specific apparatus which is set forth in considerable detail it should be understood that this is by way of illustration only and that the invention is not necessarily limited thereto. Alternative embodiments and operating techniques will become apparent to those skilled in the art in view of the disclosure. Accordingly, modifications are contemplated which may be made without departing from the spirit of the described invention or the scope of the appended claims.

We claim:

1. A differential, capacitive, pressure pickup device which is substantially nonresponsive to acceleration forces comprising a cylindrical case, closed at one end, a removable cover for closing the other end of said case, means for fastening said cover to said case to provide an air tight container, two mechanically substantially identical circular diaphragm condenser plates mounted substantially parallel to each other and stretched taut within said container, a cylindrical insulator ring separating said plates which are electrically insulated from each other, a pair of adjustable stretching rings associated with each of said plates to allow the tautness of each of said plates to be separately adjusted, said pair of stretching rings comprising a fixed ring of L-shaped cross section in its outer periphery forming a rectangular notch therein, said fixed ring having a plurality of recesses in the flat side of the ring, said recesses communicating via a plurality of openings with said notch, a plurality of screws positioned in said recesses and extending through said openings into said notch, a plate having a plurality of openings therethrough to accommodate said screws positioned on said screws, an adjustable ring rectangular cross section having threaded recesses therein to accommodate said screws positioned in said notch and on said screws, said adjustable ring being movable into and out of said notch by turning said screws with a resultant increase and decrease respectively of the tautness of the attached plate, a first compartment between said plates, second and third compartments each of which is formed between a plate and said container, gasket means associated with said stretching rings sealing said first compartment from said second and third compartments, pressure taps communicating with each of said compartments, and electrical connections to said plates.

2. A differential, capacitive, pressure pickup device which is substantially nonresponsive to acceleration forces comprising a plastic cylindrical case, closed at one end, a removable cover for closing the other end of said case, means for fastening said cover to said case to provide an air tight container, two mechanically substantially identical circular brass diaphragm condenser plates 0.001″ thick mounted substantially parallel to each other separated by a 0.001″ air gap and stretched taut within said container, a cylindrical mica insulator ring separating said plates which are electrically insulated from each other, a pair of adjustable brass stretching rings associated with each of said plates to allow the tautness of each of said plates to be separately adjusted, said pair of stretching rings comprising a fixed ring of L-shaped cross section in its outer periphery forming a rectangular notch therein, said fixed ring having a plurality of recesses in the flat side of the ring, said recesses communicating via a plurality of openings with said notch, a plurality of screws positioned in said recesses and extending through said openings into said notch, a plate having a plurality of openings therethrough to accommodate said screws positioned on said screws, an adjustable ring of rectangular cross section having threaded recesses therein to accommodate said screws positioned in said notch and on said screws, said adjustable ring being movable into and out of said notch by turning said screws with a resultant increase and decrease respectively of the tautness of the attached plate, a first compartment between said plates, second and third compartments each of which is formed between a plate and said container, gasket means associated with said stretching rings sealing said first compartment from said second and third compartments, pressure taps communicating with each of said compartments, and electrical connections to said plates.

References Cited in the file of this patent

UNITED STATES PATENTS

| | | |
|---|---|---|
| 2,004,736 | Thomas | June 11, 1935 |
| 2,482,440 | Rylsky | Sept. 20, 1949 |
| 2,500,643 | Munson | Mar. 14, 1950 |
| 2,577,435 | Siebenthaler | Dec. 4, 1951 |
| 2,605,426 | Martin | July 29, 1952 |
| 2,681,415 | Liston | June 15, 1954 |

FOREIGN PATENTS

| | | |
|---|---|---|
| 619,826 | France | Jan. 6, 1927 |